United States Patent [19]

Fite, Jr.

[11] Patent Number: 5,016,243

[45] Date of Patent: May 14, 1991

[54] AUTOMATIC FAULT RECOVERY IN A PACKET NETWORK

[75] Inventor: Franklin D. Fite, Jr., Aberdeen, N.J.

[73] Assignee: AT&T Bell Laboratories, Murray Hill, N.J.

[21] Appl. No.: 431,796

[22] Filed: Nov. 6, 1989

[51] Int. Cl.[5] .............................................. H04J 3/14
[52] U.S. Cl. ........................................ 370/16; 371/8.2
[58] Field of Search .................... 370/14, 16, 60, 94.1; 371/8.2, 11.2

[56] References Cited

U.S. PATENT DOCUMENTS

| 4,550,397 | 10/1985 | Turner et al. | 370/60 |
|---|---|---|---|
| 4,593,154 | 6/1986 | Takeda et al. | 370/16 |
| 4,679,189 | 7/1987 | Olson et al. | 370/60 |
| 4,703,477 | 10/1987 | Adelmann et al. | 370/94 |
| 4,777,595 | 10/1988 | Strecker et al. | 370/94.1 |
| 4,920,529 | 4/1990 | Sasaki et al. | 370/16 |

OTHER PUBLICATIONS

J. A. McDermid, "Design and Use of Comflex-A Hardware-Controlled Packet Switch", IEE Proceedings, vol. 127, Pt.E., No. 6, pp. 233-240, Nov. 1980.
I. Cidon et al., "Paris: An Approach to Integrated High-Speed Private Networks", International Journal of Digital and Analog Cabled Systems, vol. 1, No. 2, pp. 77-85, Apr.-Jun. 1988.
CCITT Recommendation Q.921, pp. 41-48.
Committee T1 Contribution, "Explicit Congestion Avoidance Indication as Part of Link Layer Management", T1S1, 1-89/339, T1S1.2-89/240, Jul. 17-19, 1989, pp. 1-14.
W. S. Lai, "Frame Relaying Service: An Overview", Proceedings IEEE INFOCOM 89, Apr. 23-27, 1989, pp. 668-673.
R. J. Cherukuri et al., "Frame Relay: Protocols and Private Network Applications", Proceedings IEEE INFOCOM 89, Apr. 23-27, 1989, pp. 676-685.

Primary Examiner—Douglas W. Olms
Assistant Examiner—Melvin Marcelo
Attorney, Agent, or Firm—Thomas Stafford

[57] ABSTRACT

A transmission arrangement is disclosed for recovering from faults in transmission equipment or facilities forming so-called virtual circuits for transmitting packets in a network. Faults are detected in transmission paths associated with a network node and an individual fault indication message is generated for each network facility that has at least one virtual circuit affected by the fault. Each fault indication message includes the identity of each virtual circuit on the associated network facility affected by the fault. The message is transmitted in-band on at least one of the affected virtual circuits on the associated network facility. If affected virtual circuits are terminated in the node, they are switched to alternate virtual circuits. Otherwise, the fault indication messages are transmitted over the identified facilities to other unknown nodes. A node receiving a fault indication message determines which virtual circuits identified in the message are terminated in the node and which virtual circuits pass through the node. The virtual circuits that are terminated in the node are switched to alternate virtual circuits. For virtual circuits passing through the node, the network facilities associated with them are identified and a new fault indication message is generated for each of the identified facilities. Each of the generated fault indication messages is transmitted in-band on at least one virtual circuit on the, respective, identified network facility.

26 Claims, 10 Drawing Sheets

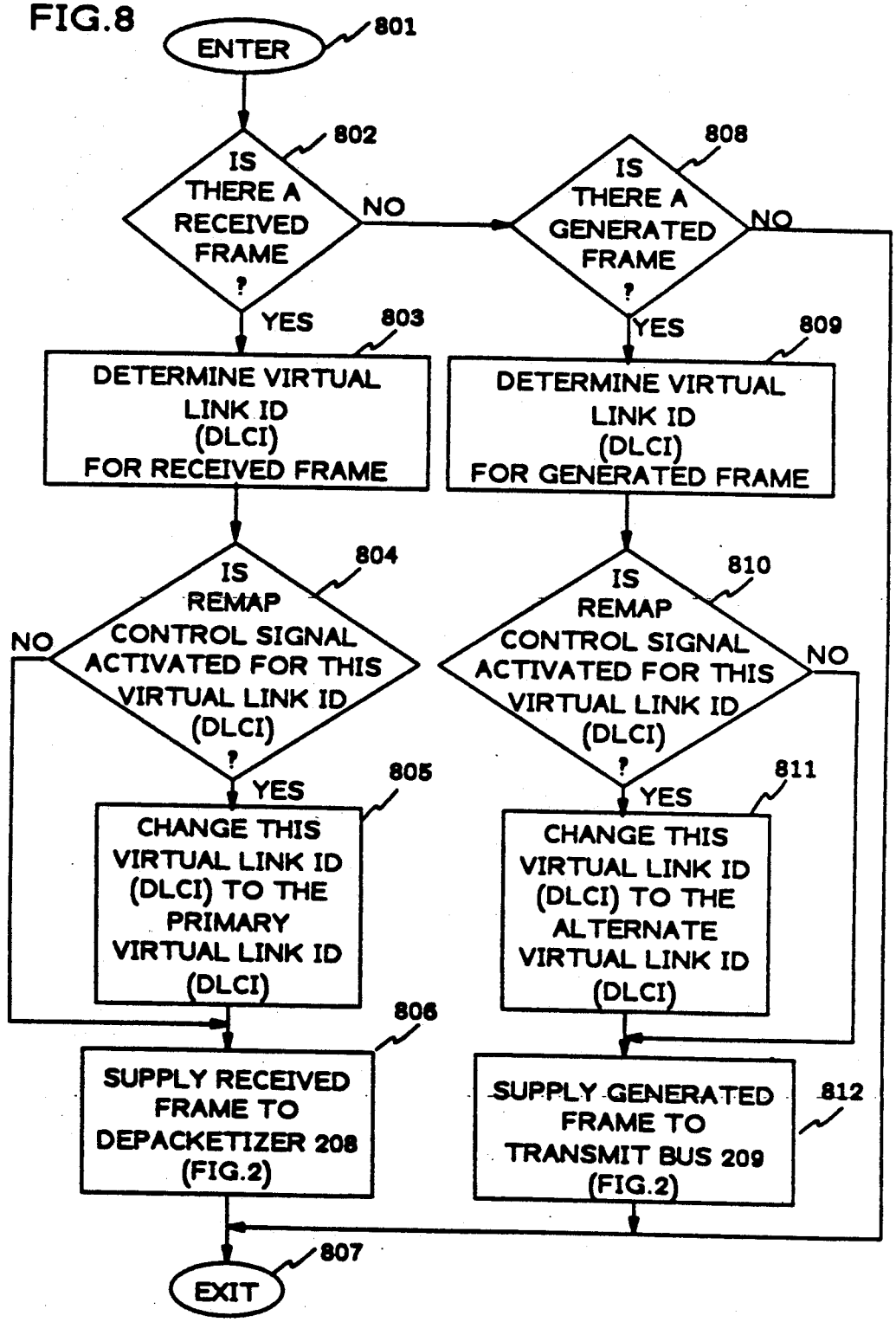

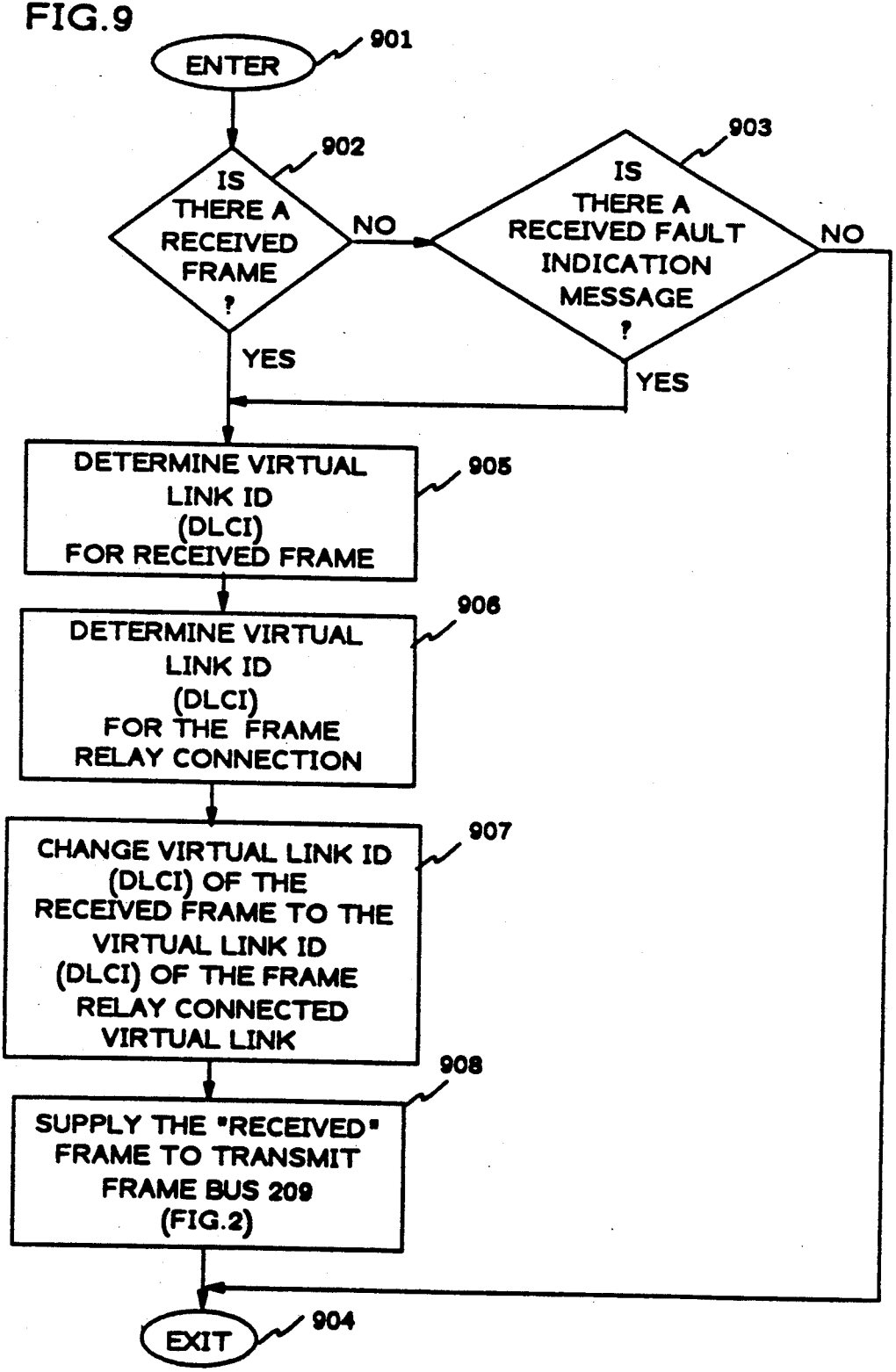

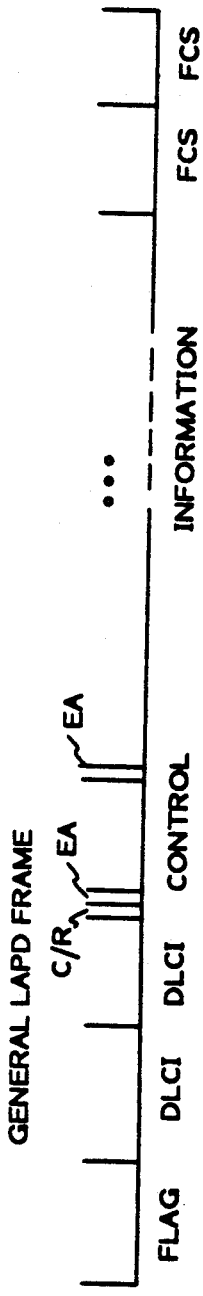
FIG.10 GENERAL LAPD FRAME
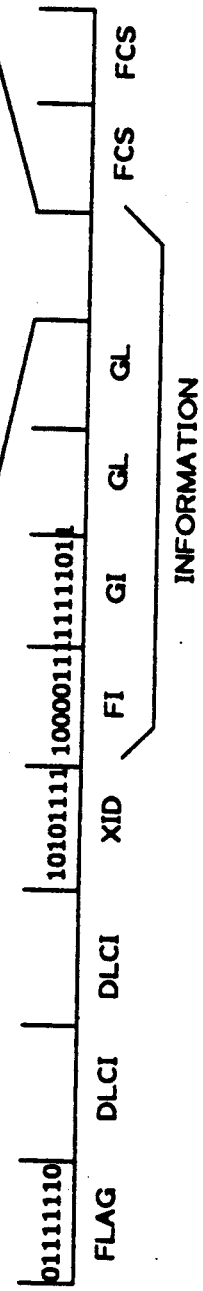
FIG.11 FAULT INDICATION MESSAGE
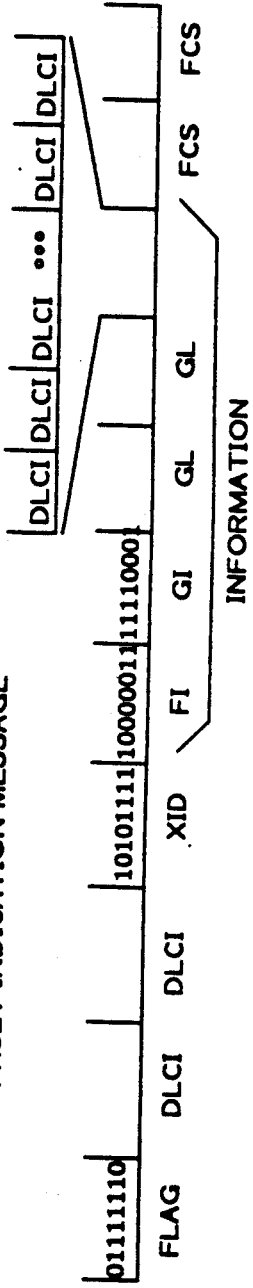
FIG.12 FAULT INDICATION MESSAGE

AUTOMATIC FAULT RECOVERY IN A PACKET NETWORK

CROSS-REFERENCE TO RELATED APPLICATIONS

U.S. patent application Ser. Nos. 07/431,797 and 07/431,795 were filed concurrently herewith.

1. Technical Field

This invention relates to packet transmission systems and/or networks and, more particularly, to automatic recovery from faults in the system and/or network.

2. Background of the Invention

Prior packet transmission and switching systems and/or networks included fault recovery arrangements. One such prior arrangement required a so-called centralized network management function to analyze reported faults and to reconfigure the network as required. Consequently, the centralized network management function needed knowledge of the entire network and connectivity to each node in the network. Such arrangements are slow to respond to faults and are also susceptible to faults in the network and in the management function itself.

In another prior fault recovery arrangement, each node in the network required knowledge of the network configuration and of faults occurring in the network. In such an arrangement, each node must store additional network configuration data other than that needed for transmission of packets in the particular node. Any change in the network configuration may require a change in the information being stored in the node. Both the storing and updating of the configuration information in the node is cumbersome and expensive to implement.

More recently, recovery from faults in a packet network has been realized by detecting faults in the transmission path associated with a network node and transmitting a fault indication message for each virtual circuit which is passing (i.e., switched) through the node and is affected by the fault. Each of the fault indication messages is transmitted in-band on each of the affected virtual circuits and is advantageously utilized to switch the affected virtual circuits to alternate virtual circuits. See, for example, my co-pending U.S. patent application Ser. No. 07/431,797, which was filed concurrently herewith. Although this arrangement functions satisfactorily in many applications, it may not function satisfactorily in others. Indeed, a problem with such an arrangement is that a large number of fault indication messages may have to be generated and transmitted by the particular node. This may require a significant amount of time, thereby delaying the desired recovery from the fault.

SUMMARY OF THE INVENTION

These and other problems and limitations of prior automatic packet fault recover arrangements are overcome, in accordance with an aspect of the invention, by detecting faults in transmission paths associated with a network node and, then, generating an individual fault indication message for each network facility connected to some other unknown node from this node that has at least one virtual circuit affected by a detected fault. Each fault indication message includes the identity of each virtual circuit on the associated network facility affected by the fault and is transmitted in-band on a virtual circuit on the associated network facility. If the node terminates any of the affected virtual circuits, no fault indication message is generated for those virtual circuits and they are switched to alternate virtual circuits.

A node receiving such a fault indication message determines which virtual circuits are terminated, i.e., exit the network, at the node and which virtual circuits pass through this node to some other unknown node in the network. Virtual circuits that are terminated in the node are switched to alternate virtual circuits. For virtual circuits passing through the node, the network facilities associated with them are identified and a fault indication message is generated for each of the identified network facilities. These fault indication messages include the identity of each of the virtual circuits passing through the node that were included in the received fault indication messages. Each of these fault indication messages is transmitted in-band on a virtual circuit on the, respective, identified network facilities.

BRIEF DESCRIPTION OF THE DRAWINGS

In the drawings:

FIG. 8 is a flow chart illustrating a sequence of operations effected by the access circuit mapping unit of FIG. 2;

FIG. 9 is a flow chart showing a sequence of operations effected by the frame relay unit of FIG. 2;

FIG. 10 is a graphic representation of a LAPD frame; and

FIGS. 11 and 12 are graphic illustrations of fault indication messages employed in this embodiment of the invention.

DETAILED DESCRIPTION

Figure 1:
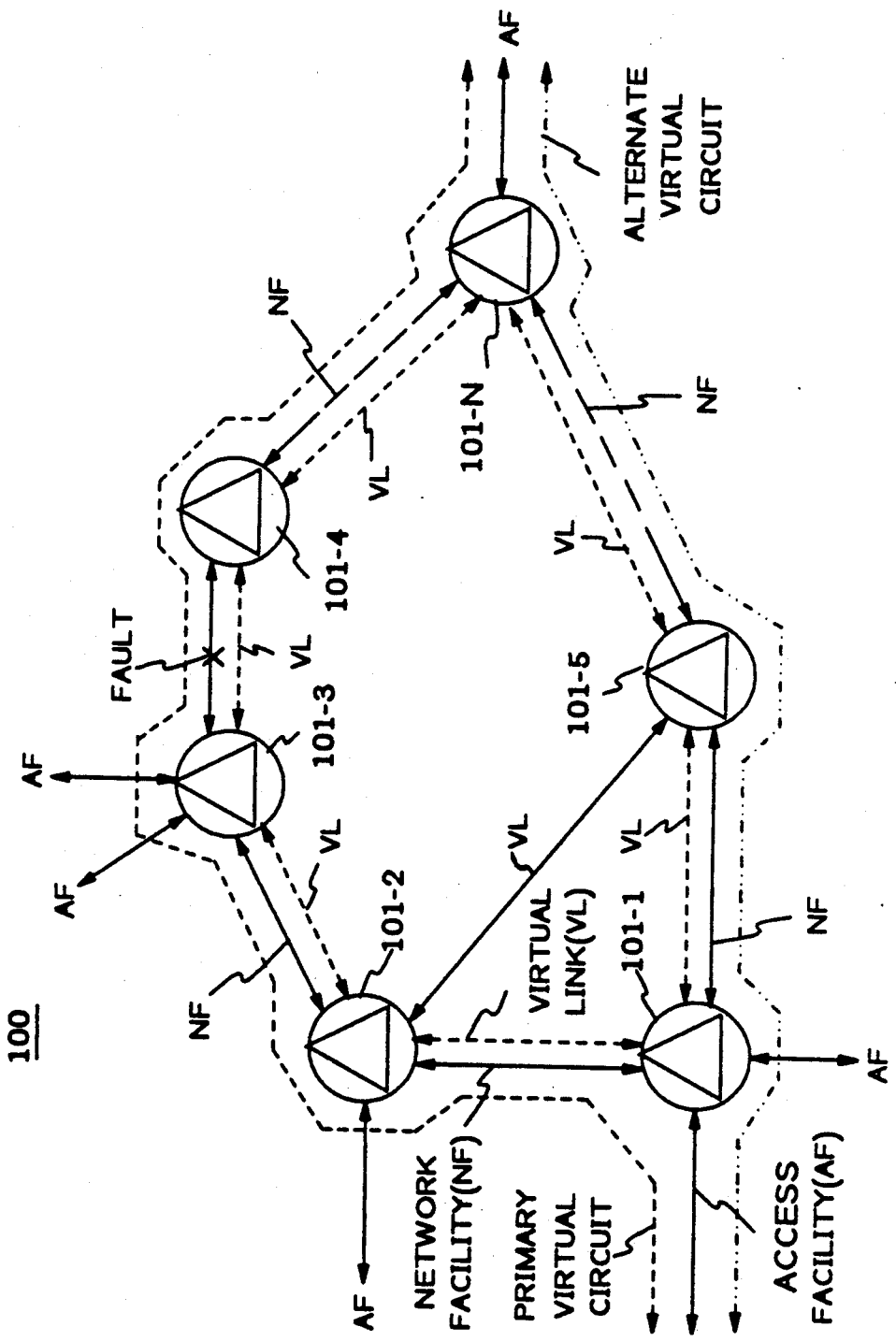
FIG. 1 shows, in simplified form, a packet transmission system and/or network including an embodiment of the invention.

FIG. 1 shows, in simplified form, details of transmission system and/or network 100 employing an embodiment of the invention. Accordingly, shown are a plurality of system and/or network nodes, namely, nodes 101-1 through 101-N. Hereinafter all references will be made to network nodes, etc. Also shown are a number of network facilities (NFs) connecting nodes 101 and access facilities (AFs) connected to particular ones of nodes 101. Network facilities carry virtual links (VLs) between nodes inside the network. Access facilities carry access circuits from the network to outside of the network and, conversely, from outside of the network to the network. In this example, some of nodes 101 are identical and others are not depending on their particular function in the network. That is, some of nodes 101 have access facilities connected to them while others do not. It will also be apparent that particular ones of nodes 101 may have a plurality of access facilities. Similarly, particular ones of nodes 101 may interface with a plurality of network facilities connecting them to one or more other nodes. In this specific example, it is assumed that the network facilities are either T1, CEPT1, or T3 transmission facilities using non-channelized ISDN packet mode framing formats, e.g., LAPD, protocols, and procedures. In some different applications, other facilities may be employed, for example, local area networks, wide area networks, RS232 and the like. Each network facility carries one or more virtual links. The access facilities are assumed to be T1 or ISDN basic rate interface (BRI) facilities. Each access facility carries one or more access circuits. In a network node, an access circuit may be connected to a virtual link or a virtual link may be connected to another virtual link. A virtual circuit for a call comprises a local access circuit, one or more virtual links connected through one or more nodes and at least one remote access circuit. It will be apparent to those skilled in the art that other transmission facilities and other packet protocols may equally be employed in practicing the invention.

For the purposes of illustrating the fault recovery operation of network 100, in accordance with an aspect of the invention, it is assumed that a primary virtual circuit, shown in dashed outline, is provisioned between an access circuit carried on the access facility (AF) shown connected to node 101-1 and an access circuit carried on the access facility (AF) shown connected to node 101-N. The primary virtual circuit is carried from originating node 101-1 to destination node 101-N through a primary path including nodes 101-2, 101-3 and 101-4 and virtual links (VLs) carried on the associated network facilities (NFs). Additionally, an alternate virtual circuit, shown in dot-dashed outline, is provisioned between the access circuit carried on the access facility (AF) connected to node 101-1 and the access circuit carried on the access facility (AF) connected to node 101-N on an alternate path passing through node 101-5 and virtual links carried on the associated network facilities (NFs). Although only one primary virtual circuit and one alternate virtual circuit are shown, there may be a plurality of such virtual circuits between node 101-1 and node 101-N. Moreover, it is important to note that none of nodes 101 in network 100 has knowledge of any other node in the network. Each of nodes 101, only knows its own mappings of access circuits to virtual links and virtual links to virtual links. It is further noted that a fault can occur in the node equipment itself or in one or more network facilities connecting nodes. In this example, it is assumed that a fault occurs somewhere in the transmission path between nodes 101-3 and 101-4.

When a fault occurs, there is a disruption in the primary virtual circuits along the primary path between node 101-1 and node 101-N. Upon detecting the fault, each of nodes 101-3 and 101-4 determines which virtual circuits and corresponding network facilities that are affected by the fault. Node 101-3 generates a fault indication message for all the affected virtual circuits on a network facility and supplies it as an output on at least one of the affected virtual circuits to node 101-2. Alternatively, a specific virtual link ID (DLCI) can be designated to transport the fault indication messages. In this example, a separate such fault indication message is generated for each network facility connected to node 101-3. In this example, only one such network facility is connected to node 101-3. In this example, the fault indication message is a LAPD frame (FIGS. 11 and 12) using a XID format. (See CCITT Recommendation Q.921, pages 42-48, and Committee T1 Contribution, "Explicit Congestion avoidance indication as part of Link Layer management", T1S1.1-89/339, T1S1.2-89/240, Jul. 17-21, 1989, pages 1-14, For an explanation of the LAPD frame and XID format). Similarly, node 101-4 generates a fault indication message for all the effected virtual circuits on a network facility and supplies it as an output on at least one of the affected virtual circuits to node 101-N. In this example, a separate such fault indication message is generated for each network facility connected to node 101-4. Again, it is noted that neither node 101-3 nor node 101-4 has knowledge of other nodes in the path or of the end points of the affected virtual circuit. Nodes 101-3 and 101-4 include information relating only to the virtual link to virtual link mapping of the virtual circuit. Upon receiving any of the fault indication messages, node 101-2 determines if any of the affected virtual circuits are terminated in this node. Since none of the virtual circuits are terminated, node 101-2 then determines which network facility and virtual link that the incoming virtual link of the affected virtual circuit is connected to for all of the affected virtual circuits. Fault indication messages are generated, as described above, for all the affected virtual circuits on a network facility and relayed over at least one virtual link on the network facility to a connected node, in this example, node 101-1. In this example, this relaying of the fault indication message is realized by employing the known LAPD frame relay procedures. (See articles entitled "Frame Relay: Protocols and Private Network Applications", *Proceedings of IEEE INFOCOM* 89, Apr. 23-27, 1989, pages 676-685 and "Frame Relaying Service: An Overview", *Proceedings of IEEE INFOCOM* 89, Apr. 23-27, 1989, pages 668-673 for an explanation of frame relay). When node 101-1 receives the fault indication message it determines that the fault indication message applies to virtual circuits that are terminated at this node. Then, node 101-1 switches the virtual circuit from its primary path that was disrupted by the fault to its alternate path that passes through node 101-5. Similar actions to those effected in node 101-1 are taken by node 101-N upon receiving the fault indication message that was originated by node 101-4. Thus, it is seen that, in accordance with an aspect of the invention, the network has recovered from the fault on the affected virtual circuits. Furthermore, it can be seen that, in accordance with an aspect of the invention, this recovery is accomplished without any node having information relating to the network topology other than for the network facilities that terminate at individual ones of nodes 101.

Figure 2:
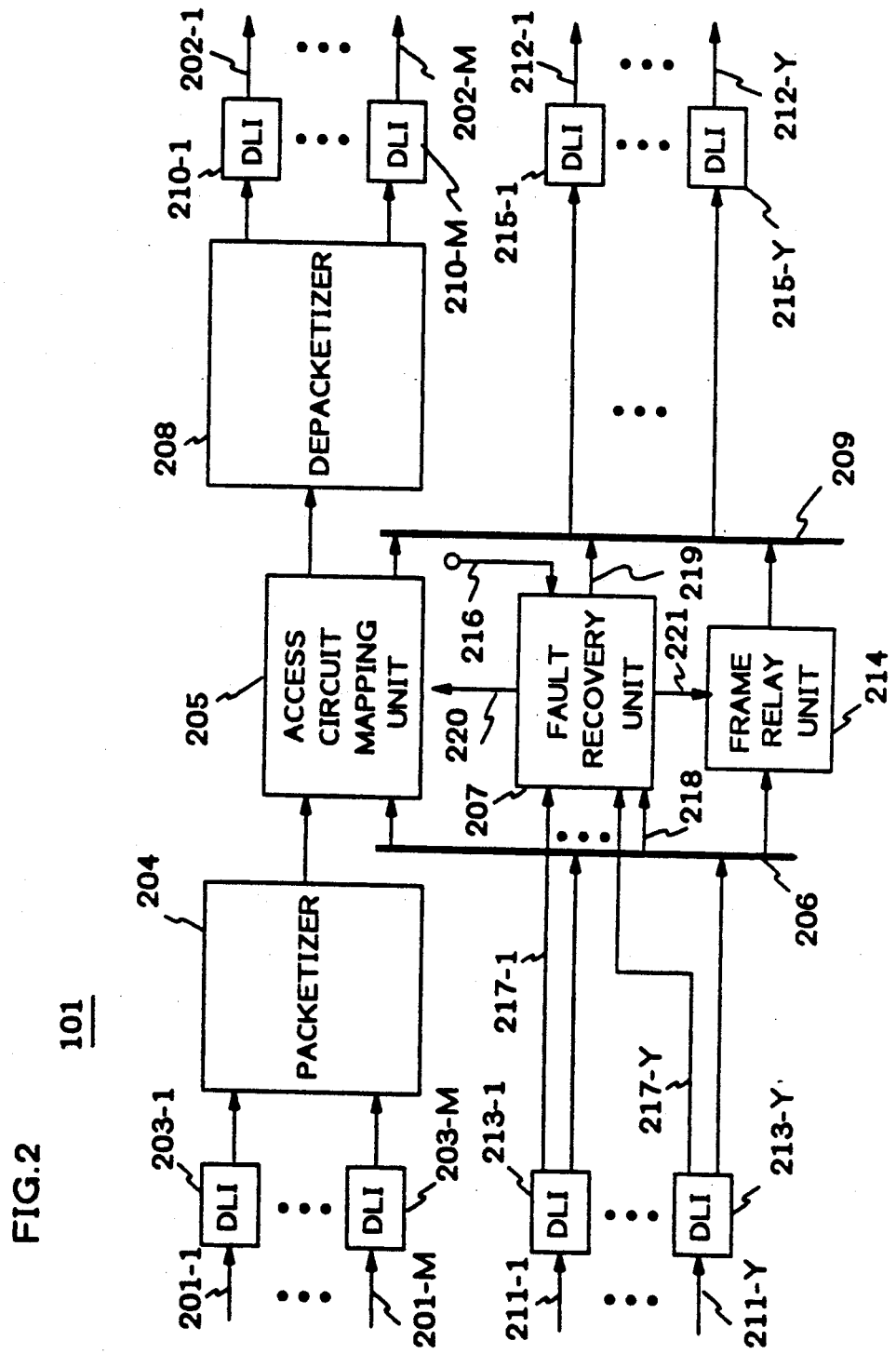
FIG. 2 depicts, in simplified block diagram form, details of a packet node used in the system and/or network of FIG. 1.

FIG. 2 shows, in simplified block diagram form, the general architecture of nodes 101. It is to be noted that the configuration of specific ones of nodes 101 may include an interface to at least one network facility and may not include any access facilities. However, a typical one of nodes 101 includes one or more receive access facilities 201-1 through 201-M, and a corresponding number of transmit access facilities 202-1 through 202-M. It is noted that pairs of receive access facilities 201-1 through 201-M and transmit access facilities 202-1 through 202-M, respectively, form the access facilities (AFs) shown in FIG. 1. As indicated above, the signals received and transmitted on the access links may take any desired form. In this example, it is assumed that the access facility signals are non-packetized T-carrier in the known DS1 format. Thus, in this example, an access facility carries up to 24 access circuits. Signals obtained from receive access facilities 201-1 through 201-M are supplied via digital line interface (DLI) units 203-1 through 203-M, respectively, to packetizer 204. Each of digital line interfaces 203 are of a type well known in the art for interfacing the DS1 signals being supplied via the receive access facilities 201. Packetizer 204 forms incoming voice or data information into a packet format. Such packetizers are known in the art. In this example, the LAPD format is used for packetization. The LAPD layer 2 data unit is known as a frame, and the layer 3 data unit is known as a packet. Thus, throughout this example, the term "frame" is used instead of "packet". The LAPD frames (FIG. 10) generated in packetizer 204 are supplied to access circuit mapping unit 205. Access circuit mapping unit 205 also obtains received frames from receive frame bus 206. Additionally, remap control signals are supplied to access circuit mapping unit 205 via circuit path 220 from fault recovery unit 207. The remap control signals control remapping of access circuits carried on receive access facilities 201 to virtual links carried on transmit network facilities 212, and the remapping of virtual links carried on receive network facilities 211 to the original access circuits carried on transmit access facilities 202. Access circuit mapping unit 205 yields so-called terminated frames which are supplied to depacketizer 208, and so-called transmit frames which are supplied to transmit frame bus 209. Operation of access circuit mapping unit 205 is described below in conjunction with FIG. 8. Depacketizer 208 reconstructs the voice or data digital signals from the terminated LAPD frames. These signals are supplied via digital line interface (DLI) units 210-1 through 210-M to transmit access facilities 202-1 through 202-M, respectively. Again, such digital line interface units and such depacketizers are known in the art.

Received LAPD frames from receive network facilities 211-1 through 211-Y are supplied to digital line interface (DLI) units 213-1 through 213-Y, respectively. Each of digital line interface units 213 is of a type well known in the art for interfacing DS1 digital signals. In this example, each of digital line interface (DLI) units 213 generates a facility failure signal in well known fashion. The facility failure signals from digital line interfaces 213-1 through 213-Y each indicate whether a red, yellow, blue, or performance alarm has occurred and are supplied via circuit paths 217-1 through 217-Y, respectively, to fault recovery unit 207. Each of digital line interface units (DLI) 213-1 through 213-Y supplies the received LAPD frames to receive frame bus 206. The received frames can be of many types, including received fault indication messages as shown in FIGS. 11 and 12. Fault recovery unit 207 obtains the received fault indication messages from receive frame bus 206 via circuit path 218, in well known fashion. An equipment failure signal indicating the failure of any unit in this node in the path of any virtual circuit is supplied via circuit path 216 to fault recovery unit 207. Fault recovery unit 207 generates transmit fault indication messages which are supplied via circuit path 219 to transmit frame bus 209 and receive fault indication messages which are supplied via circuit path 221 to frame relay unit 214. Frame relay unit 214 obtains the received frames from receive frame bus 206. Additionally, frame relay unit 214 relays transmit frames from receive frame bus 206 to transmit frame bus 209. To this end, frame relay unit 214 employs the known LAPD frame relay procedure to remap these incoming frames into transmit frames that are supplied to transmit frame bus 209. The relayed frames include appropriate address mapping for each virtual circuit. That is to say, LAPD frames that are passing through this node are frame relayed from receive frame bus 206 to transmit frame bus 209. The operation of frame relay unit 214 is described below in conjunction with FIG. 9. In turn, the appropriate transmit frames are obtained from transmit frame bus 209 by digital line interface units (DLI) 215-1 through 215-Y and, then, supplied to transmit network facilities 212-1 through 212-Y, respectively. Pairs of receive network facilities 211-1 through 21-Y and transmit network facilities 212-1 through 212-Y form the network facilities (NFs) shown in FIG. 1.

Fault recovery unit 207 monitors for fault indication messages (FIGS. 11 and 12) on receive frame bus 206. This is achieved by monitoring received frames for those that match a prescribed format. To this end, control fields in the received frames are monitored to determine if the frame includes a control message. In this example, the prescribed format is the so-called LAPD XID frame format denoting fault indication messages for either a fault condition or a clear condition, as indicated in FIG. 11 and FIG. 12, respectively. As shown in FIG. 11 and FIG. 12 the IDs (DLCIs) of the affected virtual circuits are included in fields of the information field of the LAPD frame, an indication (in this example, 10101111) that the LAPD frame is an XID frame is included in the XID field, an indication that this XID frame is a fault indication message, in accordance with an aspect of the invention, is included in the FI field and an indication, in accordance with another aspect of the invention, of whether the fault indication message denotes a fault or a clear condition is included in the GI field. Thus, in this example, as shown in FIG. 11, the indication 11111010 in the GI field denotes a fault condition and, as shown in FIG. 12, the indication 11110000 in the GI field denotes a clear condition. It is further noted that the fault condition or clear condition indicated in the GI field is for all the affected virtual circuit DLCIs in the information field. It will be apparent to those skilled in the art that other signaling arrangements may equally be employed to indicate the presence of a fault indication message. Upon obtaining a fault indication message, fault recovery unit 207 either sends a remap control signal to access circuit mapping unit 205 causing it to switch a corresponding access circuit to a virtual link included in the alternate virtual circuit, in accordance with an aspect of the invention, or sends a corresponding receive fault indication message via circuit path 221 to frame relay unit 214. In turn, frame relay unit 214 supplies the fault indication message to another node on a virtual link included in the primary virtual circuit. Additionally, fault recovery unit 207 monitors for facility or equipment failures, and either orders access circuit mapping unit 205 via remap control signals to switch the affected access circuits to alternate virtual circuits and/or generates transmit fault indication messages to be passed via transmit frame bus 209 and appropriate ones digital line interface units 215-1 through 215-Y and transmit network facilities 212-1 through 212-Y, respectively, to other ones of nodes 101 in network 100 (FIG. 1). Further details regarding operation of fault recovery unit 207 are discussed below in conjunction with FIGS. through 7.

Figure 3:
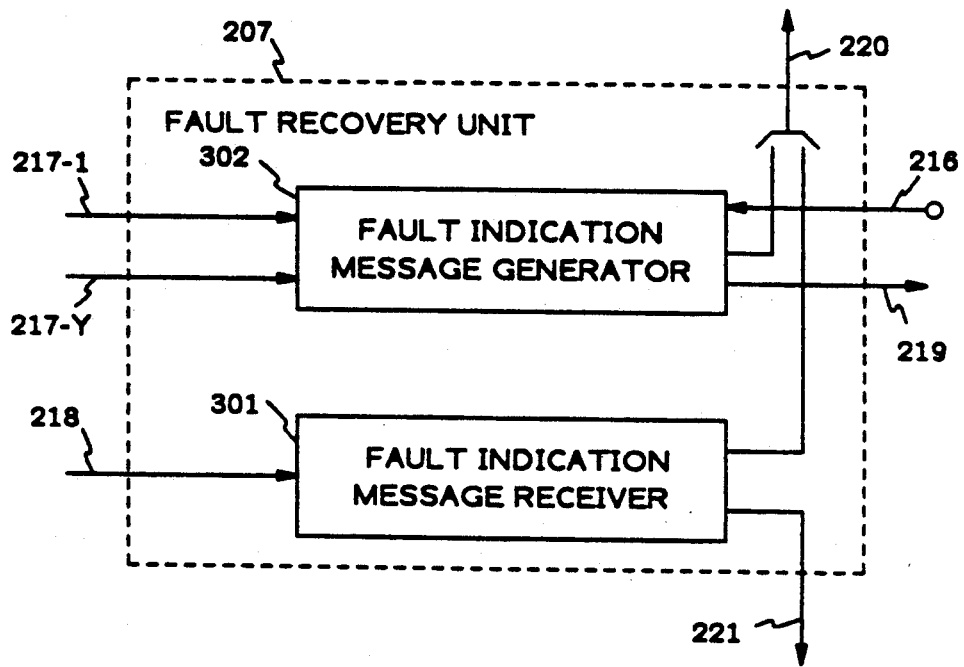
FIG. 3 shows, in simplified block diagram form, details of the fault recovery unit employed in the node of FIG. 2.

FIG. 3 depicts, in simplified block diagram form, details of fault recovery unit 207 of FIG. 2. Accordingly, shown are fault indication message receiver 301 and fault indication message generator 302. Fault indication message receiver 301 obtains received fault indication messages via circuit path 218 from receive frame bus 206. If the received fault indication message is for an access circuit in this node, the remap control signal for that access circuit is activated. If a received fault indication message is not for an access circuit in this node, it is supplied as an output unchanged to frame relay unit 214. The operation of fault indication message receiver 301 is shown in the flow chart of FIGS. 4 and 5 and described below. Fault indication message generator 302 is responsive to either a facility failure signal or an equipment failure signal becoming active or inactive. When either failure signal becomes active, fault indication message generator 302 determines if the failure affects an access circuit terminated in this node. If an access circuit terminated in this node is affected, a remap control signal for the access circuit is activated. If the affected access circuit is not in this node, a transmit fault indication message including a fault indication (FIG. 11) is generated for the affected access circuit. Similarly, when the fault is cleared, either the remap control signal is deactivated or a transmit fault indication message including a clear indication (FIG. 12) is generated. Operation of fault indication message generator 302 is described below in conjunction with the flow chart shown in FIGS. 6 and 7.

Figure 4:
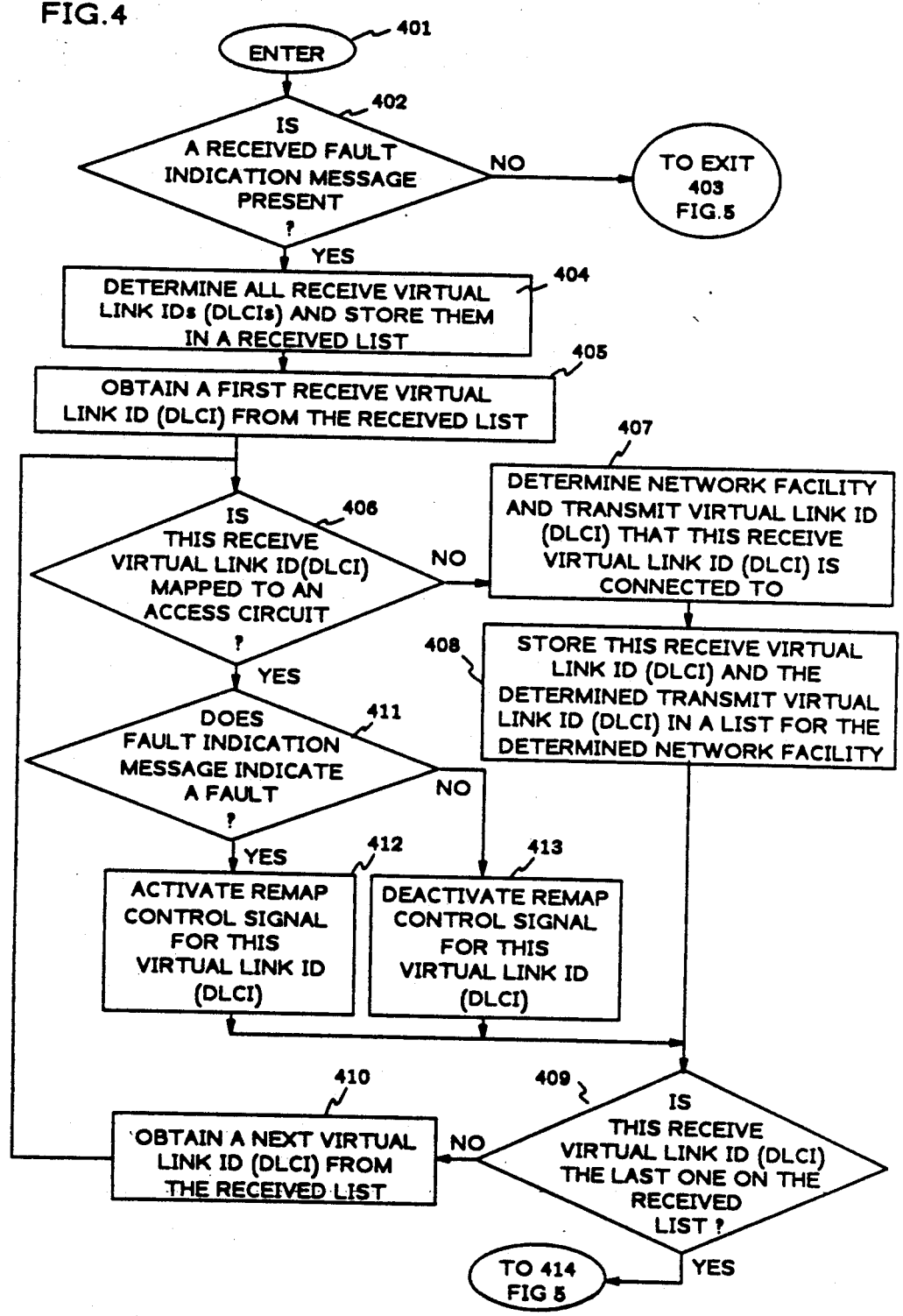
FIGS. 4 and 5 when connected as shown, form a flow chart of a sequence of operations effected by the fault indication message receiver of FIG. 3.
Figure 5:
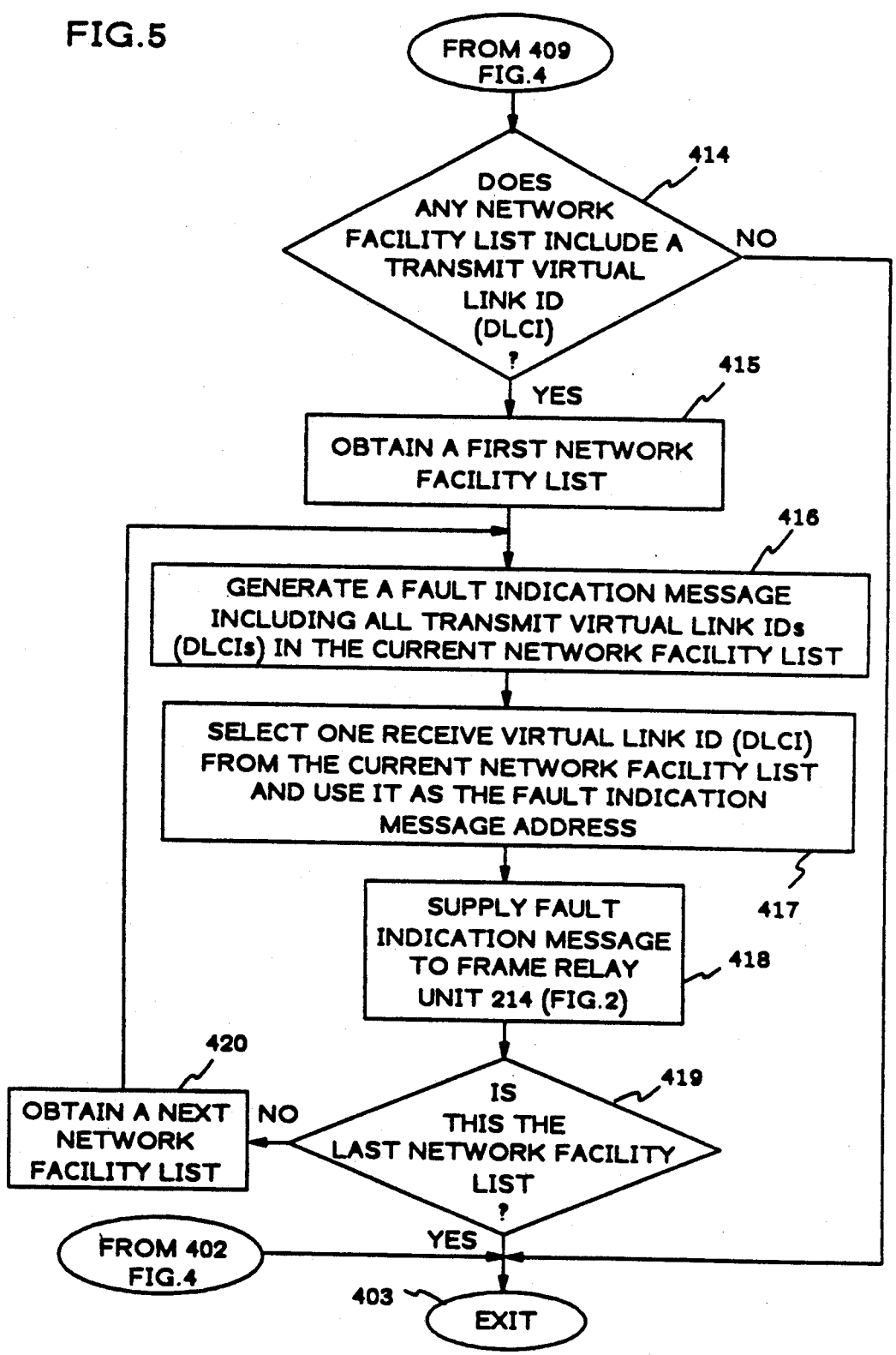

FIGS. 4 and 5, when connected as shown, form a flow chart showing a sequence of operations effected in fault indication message receiver 301 of FIG. 3. Accordingly, the sequence is entered via step 401. Thereafter, conditional branch point 402 tests to determine if there is a received fault indication message on receive frame bus 206 (FIG. 2). If the test result is NO, the sequence is exited via step 403. If the test result in step 402 is YES, operational block 404 determines all the virtual link identifications from the received fault indication message and stores them in a received list. In the LAPD format the virtual link identification (ID) is known as the DLCI. It is noted that although the virtual links are hereinafter designated "receive" and "transmit" they provide two-way transmission, i.e., incoming and outgoing. Operational block 405 obtains a first receive virtual link ID (DLCI) from the received list. Then, conditional branch point 406 tests to determine if this receive virtual link ID (DLCI) is mapped to an access circuit in this node. If the test result in step 406 is NO, operational block 407 determines the transmit virtual link ID (DLCI) that this receive virtual link ID (DLCI) is connected to and the network facility that the transmit virtual link is on. Operational block 408 stores this receive virtual link ID (DLCI) and the determined virtual link ID (DLCI) in a list for the determined network facility. Then, conditional branch point 409 tests to determine if this receive virtual link ID (DLCI) is the last one stored in the received list. If the test result in step 409 is NO, control is supplied to operational block 410.

Returning to step 406, if the test result is YES, this receive virtual link ID (DLCI) is mapped to an access circuit in this node, i.e., the virtual circuit is terminated at this node. Conditional branch point 411 tests to determine if the received fault indication message indicates the presence of a fault, or the clearing of a fault. If the test result in step 411 is YES, indicating the activation of a fault, operational block 412 supplies as an output an activated remap control signal for this receive virtual link ID (DLCI) to access circuit mapping unit 205 (FIG. 2). Thereafter, control is supplied to step 409. If the test result in step 411 is NO, indicating clearing of a fault, operational block 413 supplies as an output a deactivated remap control signal for this receive virtual link ID (DLCI) to access circuit mapping unit 205 (FIG. 2). Thereafter, control is supplied to step 409.

Returning to step 410, it causes a next virtual link ID (DLCI) to be obtaining from the received list. Then, appropriate ones of steps 406 through 413 are iterated until step 409 yields a YES result, indicating that the last virtual link ID (DLCI) has been reached in the received list.

Conditional branch point 414 tests to determine if any of the network lists formed in step 408 includes a transmit virtual link ID (DLCI). If the test result in step 414 is NO, the sequence is exited via step 403. If the test result in step 414 is YES, operational block 415 causes a first one of the network facility lists to be obtained. Then, operational block 416 generates a fault indication message including all the transmit virtual link IDs (DLCIs) in the current network facility list (FIG. 11). Operational block 417 selects at least one receive virtual link ID (DLCI) from the current network facility list for use as the address for the fault indication message generated in step 416. It is noted that frame relay unit 214 (FIG. 1) will map the at least one selected receive virtual link ID (DLCI) to the appropriate transmit virtual link ID (DLCI). In this example, only one such fault indication message is being generated. However, it may be desirable for redundancy to generate a plurality of such fault indication messages using a different receive virtual link ID (DLCI) for the address of each such message. Again, if desired, a specific virtual link ID (DLCI) can be designated to transport the fault indication messages. It will be apparent to those skilled in the art how to expand this embodiment for generating such a plurality of fault indication messages. Operational block 418 causes the fault indication message to be supplied to frame relay unit 214 (FIG. 2). Then, conditional branch point 419 tests to determine if the current network facility list is the last such list. If the test result in step 419 is YES, the sequence is exited via step 403. If the test result in step 419 is NO, operational block 420 obtains a next network facility list from those generated in step 408. Thereafter, steps 416 through 420 are iterated until step 419 yields a YES result and, then, the sequence is exited via step 403.

Figure 6:
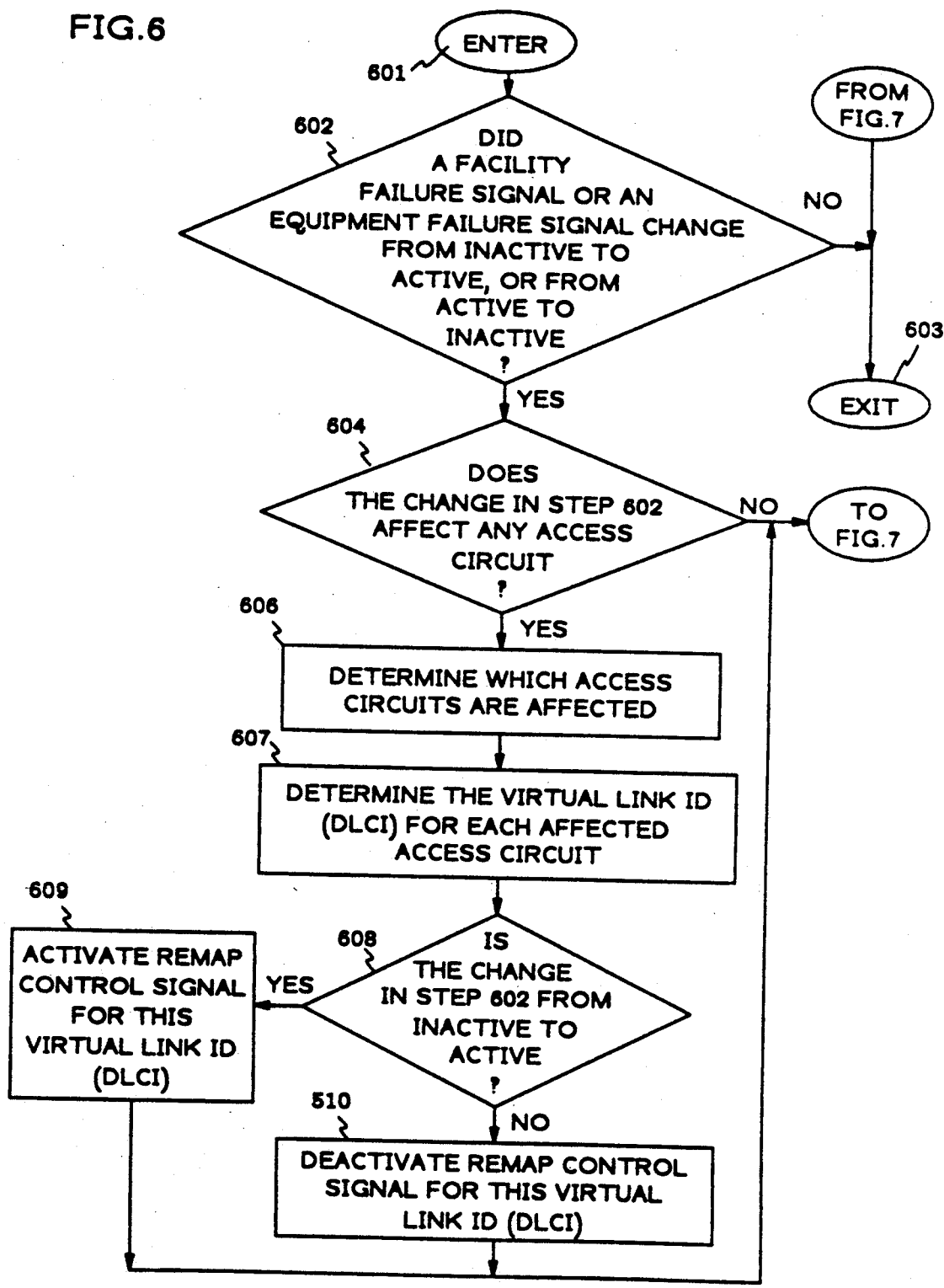
FIGS. 6 and 7 when connected as shown, form a flow chart illustrating a sequence of operations effected by the fault indication message generator of FIG. 3.
Figure 7:
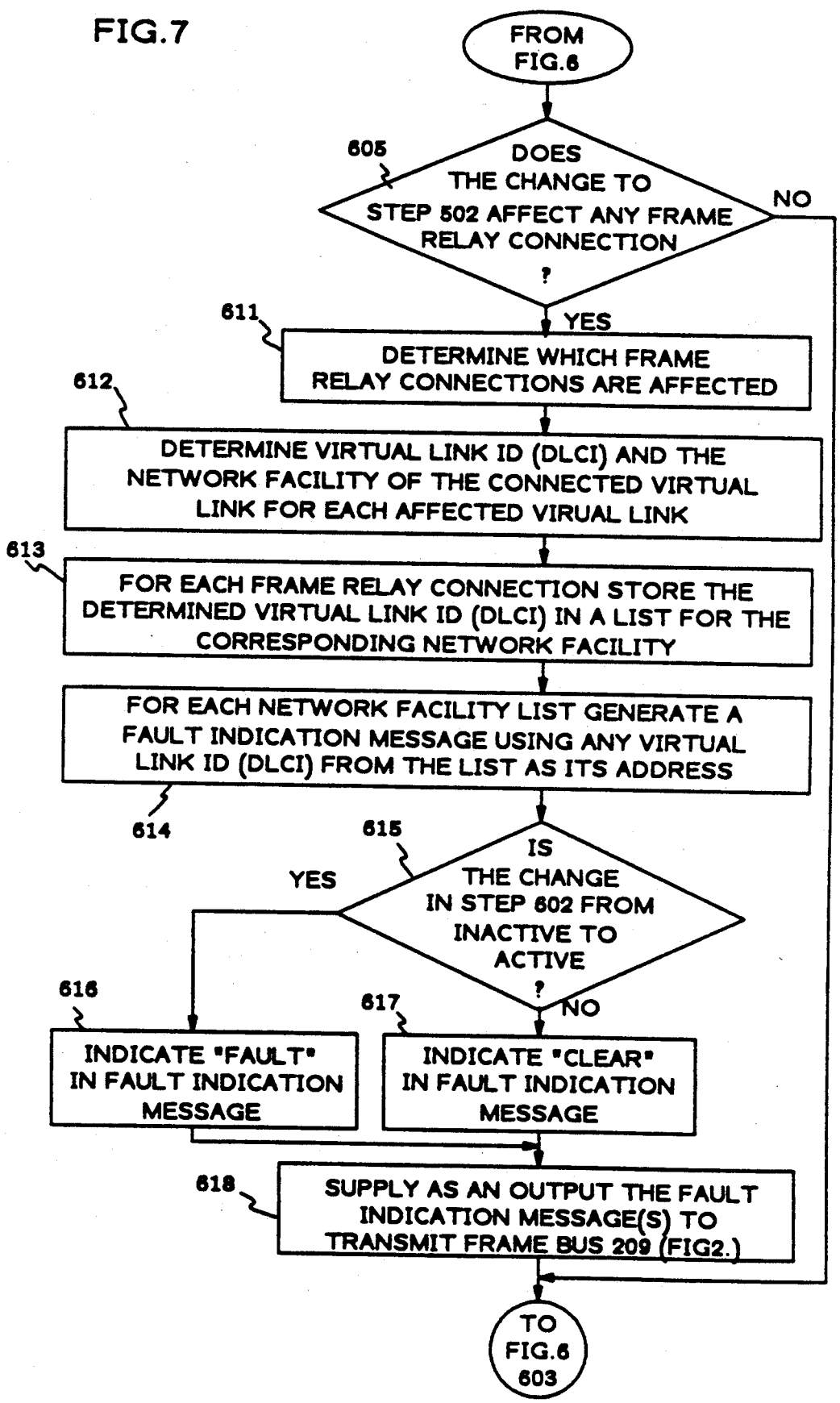

FIGS. 6 and 7, when connected as shown, form a flow chart of a sequence of operations effected by fault indication message generator 302 of FIG. 3. Accordingly, the sequence is entered via step 601. Thereafter, conditional branch point 602 tests changes in the state of either the facility failure signal or equipment failure signal. The active state indicates that a fault has occurred and the inactive state indicates that no fault is present. If there is no change in the state of these failure signals, the sequence is exited via step 603. If there is a change in the state of either of the failure signals, conditional branch point 604 tests to determine if the change of state in either of the failure signals affects any virtual link that is mapped to an access circuit at this node. If the test result in step 604 is NO, control is supplied to conditional branch point 605 (FIG. 7). If the test result in step 604 is YES, operational block 606 determines which access circuits are affected. It is noted that more than one access circuit may be affected. Then, operational block 607 determines the virtual link ID (DLCI) for each affected access circuit. Conditional branch point 608 tests to determine if the change in state of either failure signal is from inactive to active. If the test result in step 608 is YES, operational block 609 activates the remap control signal for this virtual link ID (DLCI). Then, control is supplied to conditional branch point 605 (FIG. 7). If the test result in step 608 is NO, operational block 610 deactivates the remap control signal for this virtual link ID (DLCI). Thereafter, control is supplied to conditional branch point 605 (FIG. 7). Conditional branch point 605 tests to determine if the change in state of either failure signal affects any so-called frame relay connection, i.e., virtual link to virtual link connection. It is noted that an affected frame relay connection includes a faulted or cleared virtual link and a connected virtual link. If the test result in step 605 is NO, the sequence is exited via step 603 (FIG. 5). If the test result in step 605 is YES, operational block 611 determines which frame relay connections are affected by the fault. Operational block 612 determines the virtual link ID (DLCI) and the network facility of the connected virtual link for each affected virtual link. Operational block 613 causes the virtual link ID (DLCI) determined in step 612 to be stored in a list for the corresponding network facility. Operational block 614 causes a fault indication message to be generated for each network facility list. Each such fault indication message includes all the virtual link IDs (DLCIs) from the corresponding network facility list and uses one virtual link ID (DLCI) from the corresponding list as the message address. Again, a plurality of fault indication messages could be generated for each network facility list each using a different virtual link ID (DLCI) for its address. Conditional branch point 615 tests to determine whether the change in state of either failure signal is from inactive to active. If the test result in step 615 is YES, operational block 616 causes the fault indication message(s) generated in block 614 to indicate "fault" (FIG. 11). If the test result in step 615 is NO, operational block 617 causes the fault indication message generated in block 614 to indicate "clear" (FIG. 12). Thereafter, operational block 618 supplies as an output the fault indication message(s) to transmit frame bus 209 (FIG. 2). Then, the sequence is exited via step 603 (FIG. 6).

FIG. 8 is a flow chart of a sequence of operations effected by access circuit mapping unit 205 of FIG. 2. Accordingly, the sequence is entered via step 801. Thereafter, conditional branch point 802 tests to determine if a received frame is present on receive frame bus 206 (FIG. 2). If the test result in step 802 is YES, operational block 803 determines the virtual link ID (DLCI) for the received frame. Conditional branch point 804 tests to determine if the remap control signal is active for this virtual link ID (DLCI). If the test result in 804 is YES, operational block 805 causes the virtual link ID (DLCI) determined in step 803 to be modified to a DLCI for the appropriate virtual link ID of the primary virtual circuit. If the test result in step 804 is NO, no action is taken to change the virtual link ID (DLCI) and operational block 806 supplies the received frame to depacketizer 208 (FIG. 2). Thereafter, the sequence is exited via step 807. Returning to step 802, if the test result is NO, conditional branch point 808 tests to determine if there is a generated frame from packetizer 204 (FIG. 2). If the test result in step 808 is NO, the sequence is exited via step 807. If the test result in step 808 is YES, operational block 809 determines the virtual link ID (DLCI) for the generated frame. Then, conditional branch point 810 tests to determine if the remap control signal is active for this virtual link ID (DLCI). If the test result in 810 is YES, operational block 811 changes the virtual link ID (DLCI) in the generated frame to the alternate virtual link ID (DLCI) for the appropriate virtual link in the alternate virtual circuit (FIG. 1). Then, operational block 812 supplies as an output the generated frame to transmit frame bus 209 (FIG. 2). Thereafter, the sequence is exited via step 807. Returning to step 810, if the test result is NO, the generated frame DLCI is not changed and steps 812 and 807 are iterated.

FIG. 9 is a flow chart of a sequence of operations effected in frame relay unit 214 of FIG. 2. This flow chart does not completely describe the LAPD frame relay function known to the art but only those functions necessary to this embodiment of the invention. Accordingly, the sequence is entered via step 901. Then, conditional branch point 902 tests to determine if there is a received frame on receive frame bus 206 (FIG. 2). If the test result in step 902 is NO, conditional branch point 903 tests to determine if there is a receive fault indication message on receive frame bus 206 (FIG. 2). If the result in step 903 is NO, the sequence is exited via step 904. If the test result in either step 902 or step 903 is YES, operational block 905 determines the virtual link ID (DLCI) for the received frame. Operational block 906 determines the virtual link ID (DLCI) for the connected virtual link, i.e., the frame relay connection. Operational block 907 changes the virtual link ID (DLCI) of the received frame to the virtual link ID (DLCI) for the connected virtual link. Operational block 908 supplies as an output the modified "received" frame to the transmit frame bus 209 (FIG. 2). Thereafter, the sequence is exited by step 904.

Although this embodiment of the invention has been described in terms of so-called provisioned virtual circuits and frame-relay, it will be apparent to those skilled in the art that the invention is equally applicable to switched virtual circuits and to frame switching arrangements.

I claim:

1. Apparatus in a packet node for recovering from faults in transmission paths including at least one virtual circuit in a network including a plurality of packet nodes, the apparatus comprising:

means for detecting faults in any transmission paths associated with the node, each of said transmission paths including at least one network facility transporting at least one virtual circuit;

first means for determining if any virtual circuit affected by a detected fault is terminated in the node;

first means for generating a fault indication message for each network facility transporting a virtual circuit that is affected by the detected fault and including an identity of each virtual circuit affected by the detected fault being transported on said network facility that is not terminated in the node;

first means for transmitting said generated fault indication messages, each generated fault indication message being transmitted on at least one of the affected virtual circuits being transported by a corresponding network facility away from the fault to some other node in the network; and means for switching any affected virtual circuits determined to be terminated in the node to associated alternate virtual circuits for transmission toward a destination node.

2. The apparatus as defined in claim 1 further including means for receiving fault indication messages including second means for determining if any virtual circuits identified in a received fault indication message are terminated in the node, second means for generating a fault indication message for each network facility including virtual circuits affected by a detected fault and not terminated in the node, each of said generated fault indication messages including an identity of each virtual circuit affected by the fault being transmitted on said network facility and not terminated in the node, and second means for transmitting said fault indication messages generated by said second generating means, each of said generated fault indication messages being transmitted on at least one of said affected virtual circuits on a corresponding network facility to some other node in the network.

3. The apparatus as defined in claim 2 wherein each of said virtual circuits comprises a first access circuit at an originating node, a second access circuit at a destination node and at least one virtual link.

4. The apparatus as defined in claim 3 wherein said each of said received fault indication messages for a corresponding network facility includes identities of virtual links in corresponding virtual circuits being transmitted on said corresponding network facility, said second means for determining includes means for generating a control signal representative of whether a virtual link identified in the received fault indication message is mapped to an access circuit in the node and said means for switching is responsive to said control signal for changing the identity of said virtual link to an alternate virtual link identity when said control signal indicates that said virtual link is mapped to an access circuit in the node, wherein said access circuit is mapped to an alternate virtual circuit for transmission to said destination access circuit.

5. The apparatus as defined in claim 3 wherein said first means for determining includes means for identifying access circuits in the node that are affected by the detected fault, means for identifying an associated virtual link for each access circuit in the node which is affected by the detected fault and means for generating a first control signal representative that a corresponding access circuit is mapped to a virtual link that is affected by the detected fault, and wherein said means for switching includes means responsive to said first control signal for changing the identity of said virtual link associated with the identified access circuit to an alternate virtual link identity, wherein said access circuit is mapped to an alternate virtual circuit.

6. The apparatus as defined in claim 3 wherein said each of said virtual circuits may include a virtual link being mapped to another virtual link in a node, and wherein said first means for generating a fault indication message includes means for identifying a virtual link to which a virtual link affected by the detected fault is mapped to and means for including the identity of the identified virtual link in the fault indication message being generated for the corresponding network facility having at least one affected virtual circuit, and wherein said first means for transmitting supplies said generated fault indication message as an output on at least one affected virtual circuit being transported on said corresponding network facility.

7. The apparatus as defined in claim 3 wherein said second means for generating includes means for determining an identity of a virtual link in said received fault indication message, means for determining an identity of an associated virtual link to which said identified virtual link is to be connected to, means for including the virtual link identification of the associated virtual link in the fault indication message, and wherein said second means for transmitting includes means for supplying the fault indication message including identities of all associated virtual links as an output on at least one affected virtual circuit being transported on said corresponding network facility.

8. The apparatus as defined in claim 3 wherein said fault indication message comprises a frame including a plurality of fields, a predetermined field including identities of all virtual links of corresponding virtual circuits affected by the detected fault being transported by a corresponding network facility and a field including an indication of whether a fault condition exists.

9. The apparatus as defined in claim 8 wherein a field in said frame includes an indication representative that the frame is a fault indication message.

10. The apparatus as defined in claim 9 wherein said frame is a LAPD XID frame having a field including an indication that the frame is an XID frame.

11. A packet network including a plurality of packet nodes, each of the packet nodes including apparatus for recovering from faults in transmission paths transporting at least one virtual circuit associated with the node, the apparatus comprising:

means for detecting faults in any transmission paths associated with the node, each of said transmission paths including at least one network facility transporting at least one virtual circuit;

first means for determining if any virtual circuit affected by a detected fault is terminated in the node;

first means for generating a fault indication message for each network facility transporting a virtual circuit that is affected by the detected fault and including an identity of each virtual circuit affected by the detected fault being transported on said network facility that is not terminated in the node;

first means for transmitting said generated fault indication messages, each generated fault indication message being transmitted on at least one of the affected virtual circuits being transported by a corresponding network facility away from the fault to some other node in the network; and means for switching any affected virtual circuits determined to be terminated in the node to associated alternate virtual circuits for transmission toward a destination node.

12. The apparatus as defined in claim 11 further including means for receiving fault indication messages including second means for determining if any virtual circuits identified in a received fault indication message are terminated in the node, second means for generating a fault indication message for each network facility including virtual circuits affected by a detected fault and not terminated in the node, each of said generated fault indication messages including an identity of each virtual circuit affected by the fault being transmitted on said network facility and not terminated in the node, and second means for transmitting said fault indication messages generated by said second generating means, each of said generated fault indication messages being transmitted on at least one of said affected virtual circuits on a corresponding network facility to some other node in the network.

13. The apparatus as defined in claim 12 wherein each of said virtual circuits comprises a first access circuit at an originating node, a second access circuit at a destination node and at least one virtual link.

14. The apparatus as defined in claim 13 wherein said each of said received fault indication messages for a corresponding network facility includes identities of virtual links in corresponding virtual circuits being transmitted on said corresponding network facility, said second means for determining includes means for generating a control signal representative of whether a virtual link identified in the received fault indication message is mapped to an access circuit in the node and said means for switching is responsive to said control signal for changing the identity of said virtual link to an alternate virtual link identity when said control signal indicates that said virtual link is mapped to an access circuit in the node, wherein said access circuit is mapped to an alternate virtual circuit for transmission to said destination access circuit.

15. The apparatus as defined in claim 13 wherein said first means for determining includes means for identifying access circuits in the node that are affected by the detected fault, means for identifying an associated virtual link for each access circuit in the node which is affected by the detected fault and means for generating a first control signal representative that a corresponding access circuit is mapped to a virtual link that is affected by the detected fault, and wherein said means for switching includes means responsive to said first control signal for changing the identity of said virtual link associated with the identified access circuit to an alternate virtual link identity, wherein said access circuit is mapped to an alternate virtual circuit.

16. The apparatus as defined in claim 13 wherein each of said virtual circuits may include a virtual link being mapped to another virtual link in a node, and wherein said first means for generating a fault indication message includes means for identifying a virtual link to which a virtual link affected by the detected fault is mapped to and means for including the identity of the identified virtual link in the fault indication message being generated for the corresponding network facility having at least one affected virtual circuit, and wherein said first means for transmitting supplies said generated fault indication message as an output on at least one affected virtual circuit being transported on said corresponding network facility.

17. The apparatus as defined in claim 13 wherein said second means for generating includes means for determining an identity of a virtual link in said received fault indication message, means for determining an identity of an associated virtual link to which said identified virtual link is to be connected to, means for including the virtual link identification of the associated virtual link in the fault indication message, and wherein said second means for transmitting includes means for supplying the fault indication message including identities of all associated virtual links as an output on at least one affected virtual circuit being transported on said corresponding network facility.

18. The apparatus as defined in claim 13 wherein said fault indication message comprises a frame including a plurality of fields, a predetermined field including identities of all virtual links of corresponding virtual circuits affected by the detected fault being transported by a corresponding network facility and a field including an indication of whether a fault condition exists.

19. The apparatus as defined in claim 18 wherein a field in said frame includes an indication representative that the frame is a fault indication message.

20. The apparatus as defined in claim 19 wherein said frame is a LAPD XID frame having a field including an indication that the frame is an XID frame.

21. A method for recovering from faults in transmission paths associated with a packet node including at least one virtual circuit associated with a packet node in a network including a plurality of packet nodes, the method comprising the steps of:

detecting faults in any transmission paths associated with the node, each of said transmission paths including at least one network facility transporting at least one virtual circuit;

for determining if any virtual circuit affected by a detected fault is terminated in the node;

generating a fault indication message for each network facility transporting a virtual circuit that is affected by the detected fault and including an identity of each virtual circuit affected by the detected fault being transported on said network facility that is not terminated in the node;

transmitting said generated fault indication messages, each generated fault indication message being transmitted on at least one of the affected virtual circuits being transported by a corresponding network facility away from the fault to some other node in the network; and switching any affected virtual circuits determined to be terminated in the node to associated alternate virtual circuits for transmission toward a destination node.

22. The method as defined in claim 21 further including the steps of receiving fault indication messages including the step of determining if any virtual circuits identified in a received fault indication message are terminated in the node, generating a fault indication message for each network facility including virtual circuits affected by a detected fault and not terminated in the node, each of said generated fault indication messages including an identity of each virtual circuit affected by the fault being transmitted on said network facility and not terminated in the node, and transmitting said fault indication messages generated by said second generating means, each of said generated fault indication messages being transmitted on at least one of said affected virtual circuits on a corresponding network facility to some other node in the network.

23. The method as defined in claim 22 wherein each of said virtual circuits comprises a first access circuit at an originating node, a second access circuit at a destination node and at least one virtual link.

24. The method as defined in claim 23 wherein said fault indication message comprises a frame including a plurality of fields, a predetermined field including identities of all virtual links of corresponding virtual circuits affected by the detected fault being transported by a corresponding network facility and a field including an indication of whether a fault condition exists.

25. The method as defined in claim 24 wherein a field in said frame includes an indication representative that the frame is a fault indication message.

26. The method as defined in claim 25 wherein said frame is a LAPD XID frame having a field including an indication that the frame is an XID frame.

* * * * *